Aug. 23, 1966    R. CHABASSIER ETAL    3,267,875
DEVICE FOR OPERATING A MOVABLE TROLLEY
Filed Jan. 6, 1964    5 Sheets-Sheet 4

INVENTORS
ROGER CHABASSIER
PIERRE CHAFFIOTTE
JEAN MEGRET
BY Bacon & Thomas
ATTORNEYS Aug. 23, 1966   R. CHABASSIER ETAL   3,267,875
DEVICE FOR OPERATING A MOVABLE TROLLEY
Filed Jan. 6, 1964                                    5 Sheets-Sheet 5

INVENTORS
ROGER CHABASSIER
PIERRE CHAFFIOTTE
JEAN MEGRET
BY Bacon & Thomas ATTORNEYS

3,267,875
DEVICE FOR OPERATING A MOVABLE TROLLEY
Roger Chabassier, Paris, Pierre Chaffiotte, Cormeilles en Parisis, and Jean Megret, Argenteuil, France, assignors to Commissariat à l'Energie Atomique, Paris, France
Filed Jan. 6, 1964, Ser. No. 335,874
Claims priority, application France, Jan. 10, 1963, 920,988
5 Claims. (Cl. 104—162)

The present invention relates to an installation for the operation of a trolley which is movable on a stationary support and which performs the same function as the trolleys which are employed in swimming-pool reactors for the purpose of displacing an irradiation loop relatively to the reactor core.

It is already known to employ in installations of this type a drive mechanism which makes it possible by means of a coupling system to displace the trolley either in one direction or in the other radially with respect to the reactor core, the said trolley being guided along horizontal rails which are mounted on a false floor of the water tank.

These arrangements are subject to the disadvantage that they do not permit the displacement of the trolley in the event of failure of the normal drive mechanism. In such a case, the trolley which supports the irradiation loop is liable to be immobilized in a position close to the reactor core, thereby extending the time of irradiation of the materials contained therein; and it can even prove necessary to shut down the reactor in order to prevent dangerous overheating.

The general aim of the present invention is to overcome this disadvantage by providing means which permit the possibility of withdrawing the truck from the core at the time of any failure of the normal drive mechanism.

Accordingly, the invention has for its object an installation for the operation of a trolley which is adapted to move on a stationary support, especially for the purpose of moving an irradiation loop away from the core of a swimming pool reactor or for the purpose of moving said loop nearer to said core, said installation comprising a main drive mechanism which serves to displace the trolley in two opposite directions, an auxiliary drive mechanism which is synchronized under normal conditions with said main drive mechanism and which serves to displace said trolley in at least one direction independently of said main drive mechanism, a coupling between said trolley and said main drive mechanism and a device which serves to release said coupling and to set into operation the auxiliary drive mechanism alone.

One particular form of embodiment of the invention which is given solely by way of non-limitative example will now be described hereinafter, reference being made to the accompanying drawings, in which.

Figure 1:
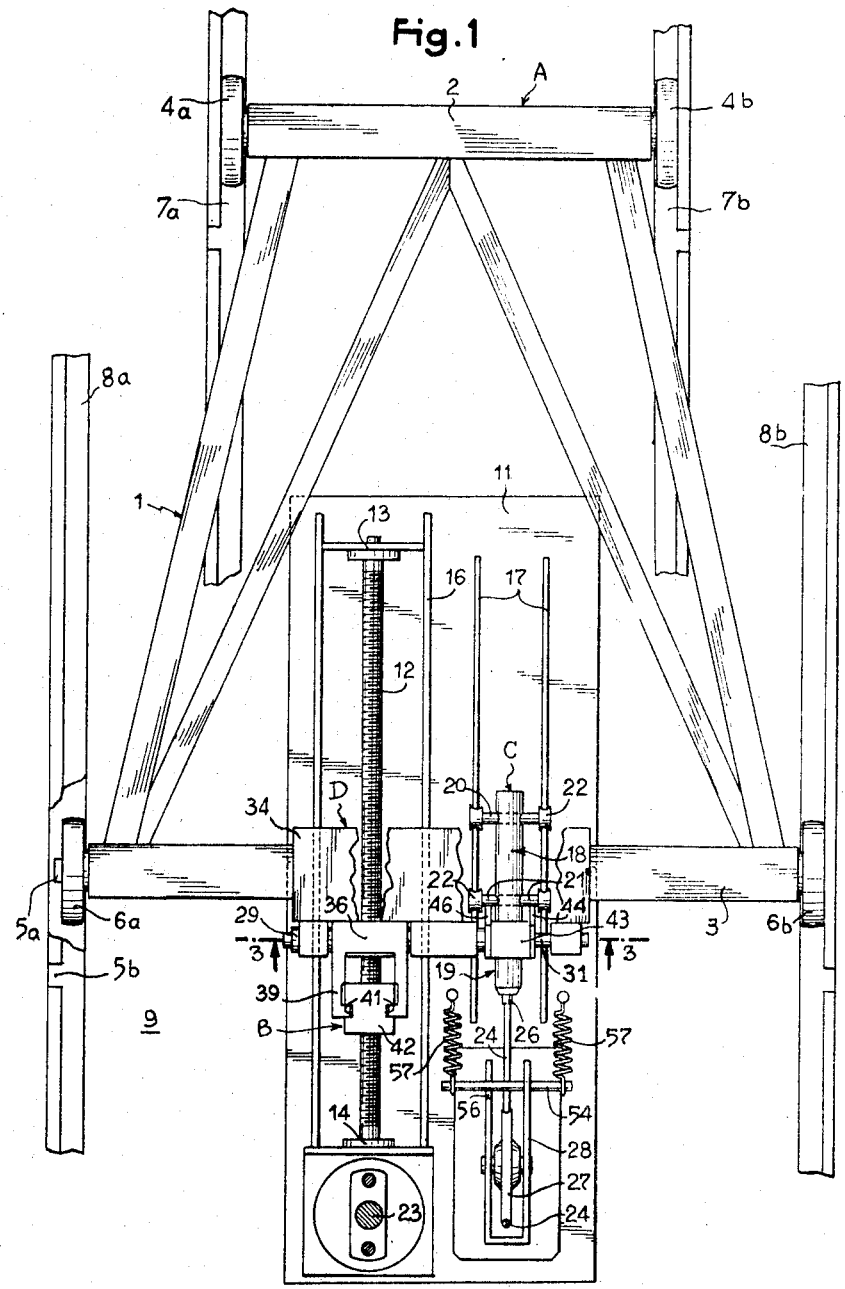
FIG. 1 is an overhead plan view of the trolley assembly in accordance with the invention.

The trolley A in accordance with the invention consists of a frame 1 whereby a front axle 2, which is located on the same side as the core of the swimming pool reactor, is rigidly secured to a rear axle 3. Said axles are fitted with wheels 4a, 4b and 6a, 6b which are guided by rails 7a, 7b, 8a, 8b respectively. The said rails have a cross-section in the shape of an inverted U within which is slidably fitted the extremity 5a of the axle shaft, the interruption at 5b of the upper arm of said U permitting the possibility of lifting the trolley. The combined assembly is supported on a horizontal floor 9. Means which have not been shown in the drawings make it possible to fix an irradiation loop on the trolley A, thereby permitting the possibility of moving said loop either nearer to or away from the reactor core.

The operation of the trolley A is performed under normal conditions by means of a main drive mechanism B consisting of a threaded rod or worm-screw 12 on which is screwed a nut 42 and the rotation of which either in one direction or the other is produced by the device 23. In the event of failure of this mechanism, the operation of the trolley A is carried out by means of an auxiliary mechanism C, the operation of which is synchronized under normal conditions with that of the main drive mechanism B by virtue of an uncouplable synchronization device of any type known per se. The said auxiliary drive mechanism C consists of a carriage 18 which can be displaced independently of the main drive mechanism as a result of a tractive effort exerted on the cable 24. Said mechanism is actuated from the same devices, whether by motor or by manual control wheel, the synchronization taking place at the level of the transmission systems.

The drive transmission to the trolley A is carried out by means of a separable coupling system D which is integral with the trolley A through the intermediary of the support plate 34 and of the frame 33 and which is capable of rocking between two positions. The said coupling system D comprises on the one hand a metal bracket 36 provided with claws 39 which, depending on the position of the assembly, are either engaged or not with the nut 42 and on the other hand a yoke lever 43, the heel 46 of which is continuously in contact with the carriage 18 by virtue of the synchronization provided under normal working conditions and which permits of emergency driving of the trolley. The yoke lever 43 also permits the initiation of the rocking motion of the coupling system D from one position to the other by applying a tractive effort on the cable 24.

The main drive mechanism B and the auxiliary drive mechanism C are both carried on a horizontal plate 11 which is integral with the flooring 9. The plate 11 is placed between the rails 7a and 7b which guide the trolley. The threaded rod 12 is rotatably mounted at 13 and 14 in a frame 16 which is secured to the plate 11. The carriage 18 comprises a longitudinal member 19 and two axles 20 and 21 which are fitted with rollers 22. The said rollers are guided by two parallel rails 17 which are secured to the plate 11 and which are parallel to the threaded rod 12.

The threaded rod 12 is driven by a countershaft system of which only the vertical drive shaft 23 has been shown in FIG. 1. As regards the carriage 18, this latter can be moved in a forward direction by means of a cable 24 which is anchored at 26 to the forward end of the longitudinal member 19 and which is passed over a guide pulley 27, said pulley being rotatably mounted in a shell 28 which is secured to the plate 11.

Figure 3:
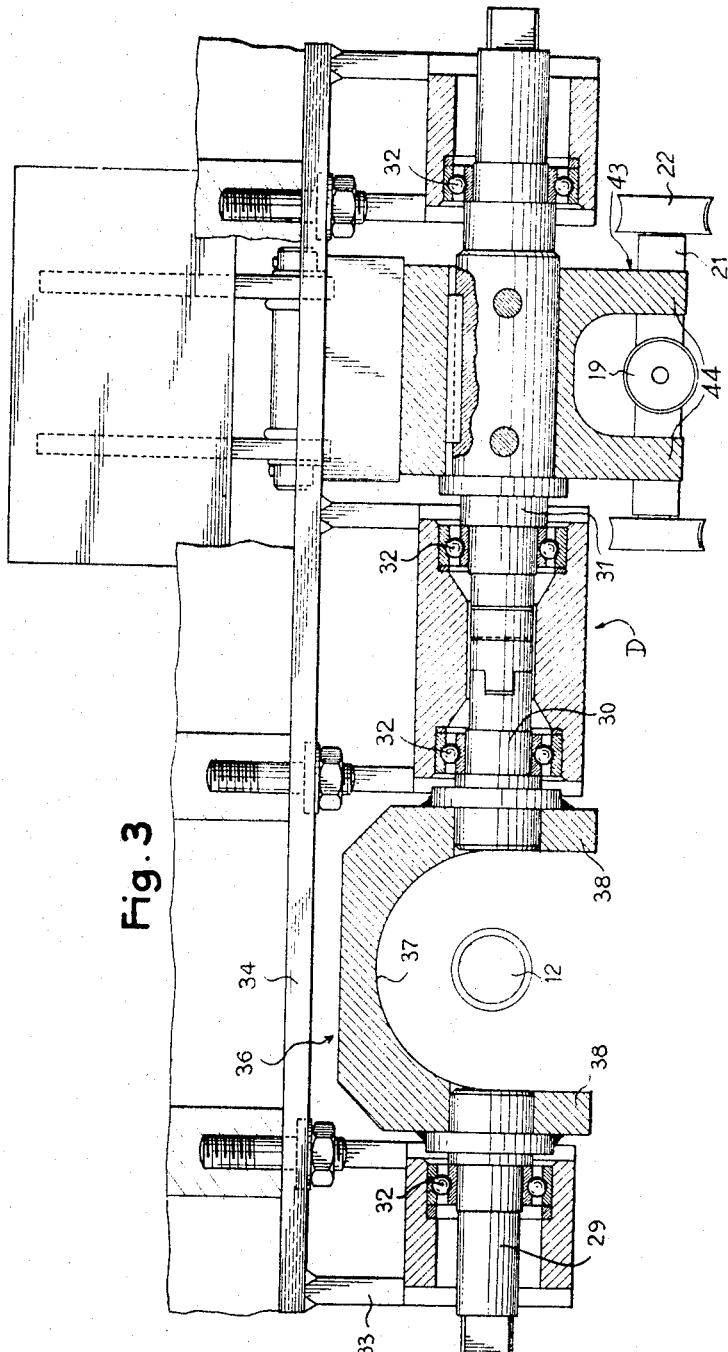
FIG. 3 is a view of the coupling means, said view being taken along the line 3—3 of FIG. 1.

The coupling system D (as shown in FIG. 3) essentially comprises a shaft which is composed of a number of sections 29, 30, 31 and journalled in bearings 32 which are mounted on a frame 33 forming part of the frame 1, said frame 33 comprising in particular a support plate 34.

Figure 2:
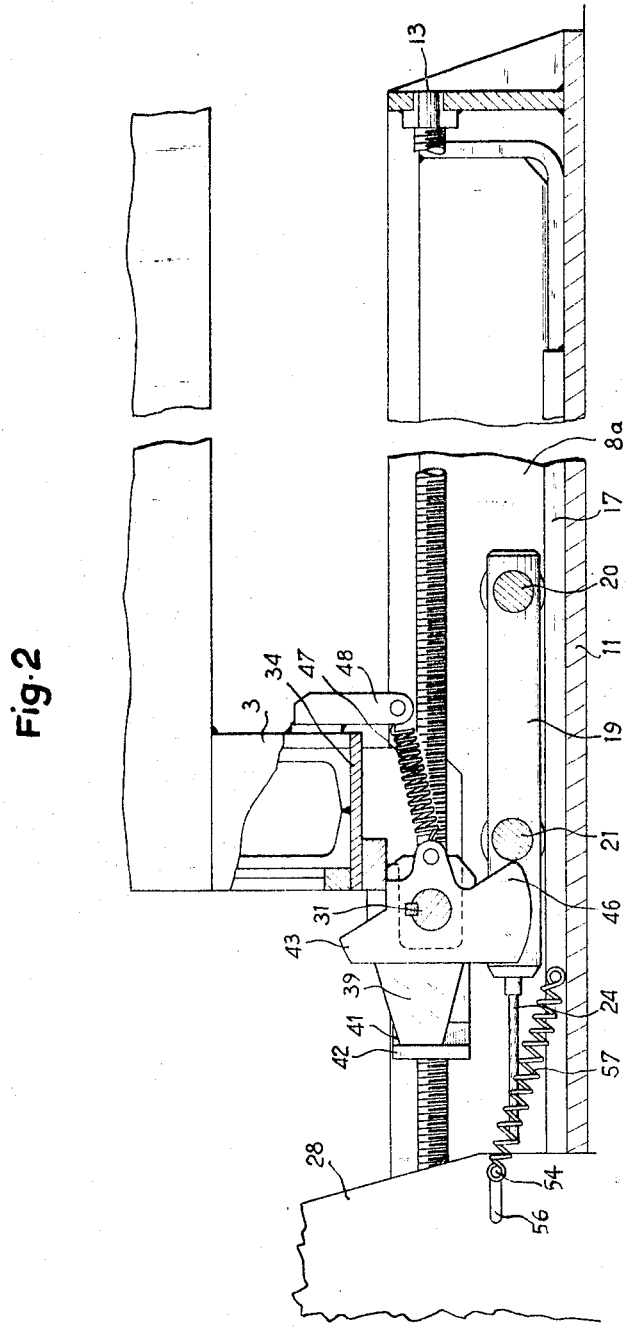
FIG. 2 is a view in side elevation of said trolley.

The two sections 29, 30 of the shaft are joined together at the level of the threaded rod 12 by means of a coupling bracket 36 which, in the vertical diametral plane of the shaft has the shape of an arc 37 located above the axis of the shaft 29, 30 and the arms of which extend vertically at 38 beneath said axis. There are formed at 38 two claws 39 (as shown in FIGS. 1 and 2) which are at right angles to the plane of the arc 37, and the extremities of which are adapted to engage in separable manner in recesses 41 formed in a nut 42 which is screwed onto the threaded rod 12.

Figure 4:
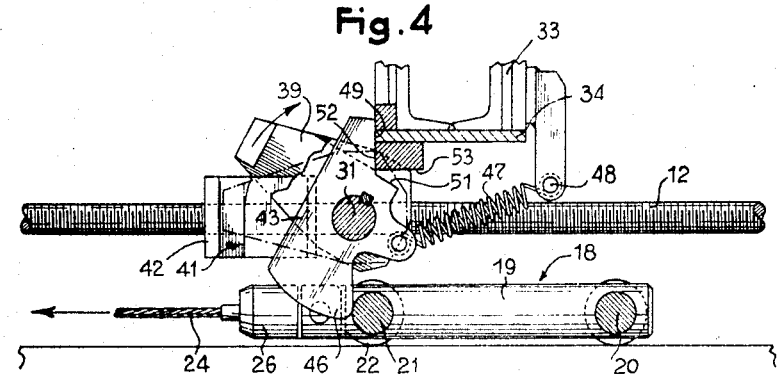
FIG. 4 is a diagrammatic view which shows the mode of action of the separable coupling which connects the trolley to the main drive mechanism.

As is shown more particularly in FIG. 4, a yoke 43 forming a lever is fixed on the portion 31 of the shaft of the coupling system. The arms 44 of the yoke lever 43 are adapted to bridge the longitudinal member 19 of the carriage 18 on the forward side of the carriage axles and are provided at the rear end with an appendage or heel 46 which is adapted to cooperate with the front axle 21 of the carriage. In addition, the lever 43 is connected by a spring 47 to a fixed point 48 of the trolley under conditions such that the action of the spring produces the rotation of the shaft 29, 30, 31 in the direction which tends to maintain the claws 39 in the position of engagement with the nut 42 (namely the counterclockwise direction as shown in FIG. 4). As will be apparent from FIG. 4, the rocking motion of the shaft in either direction is limited in amplitude by the abutting contact of a bearing surface 49 or 51 of the yoke lever 43 with complementary surfaces 52, 53 of the frame 33 which is integral with the trolley A.

Figure 7:
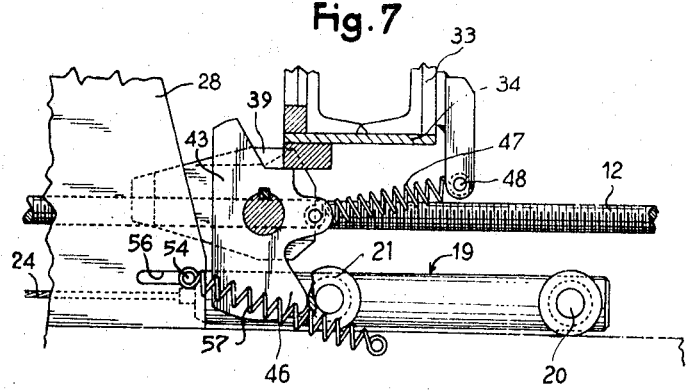
FIGS. 7 and 8 are views of the carriage at the end of travel showing the relative positions of the abutment rod, of the carriage and of the trolley as corresponding to the two modes of propulsion which are represented in FIGS. 5 and 6 respectively.
Figure 8:
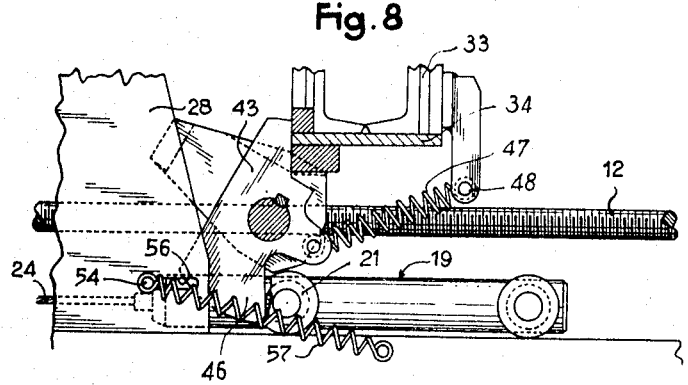

An abutment rod 54 serves to limit the travel of the carriage when the trolley is moved away from the core (as shown in FIGS. 1 and 7). The abutment rod 54 passes through two elongated slots 56 of the shell 28 which carries the pulley 27 and is urged in the direction of the core by two springs 57 which are secured to the plate. The travel of the trolley is in turn limited by stops which have not been shown in the drawings. When the trolley is in the abutment position, the rod 54 is accordingly located either at the forward end (as shown in FIG. 7) or at the rear end (as shown in FIG. 8) of the elongated slots 56, depending on whether the yoke lever 43 is located in the vertical position or in the tilted position.

The operation of the trolley which has just been described is as follows:

Under normal conditions, the worm-screw mechanism B is alone employed for the purpose of displacing the trolley either in one direction or the other, and the carriage 18 follows the trolley as a result of the synchronization (not shown) between the unwinding of the cable 24 and the main drive. The claws 39 of the coupling bracket 36 are then engaged with the nut 42 (as shown in FIG. 1), the displacement of which also produces the displacement of the trolley A.

Whenever the main drive mechanism B is no longer in working condition by reason of any damage which may have been sustained, and when the trolley carries a loop which is immersed near the reactor core, use is made of the standby cable mechanism B, the procedure being in that case as follows:

The coupling bracket 36 is released from the screw 42 by applying on the cable 24 a tractive effort which causes the shaft 29, 30, 31 of the coupling system to rock in opposition to the spring 47. The final corresponding position is shown in FIG. 4, wherein the claws 39 are no longer engaged with the nut 42. If a pull is maintained on the cable, the carriage 18 is displaced conjointly with the trolley A, as a result of the cooperation of the front axle 21 of the carriage with the heel 46 of the yoke lever 43. During this movement, the arc 37 passes over the nut 42 which is now stationary.

Figure 5:
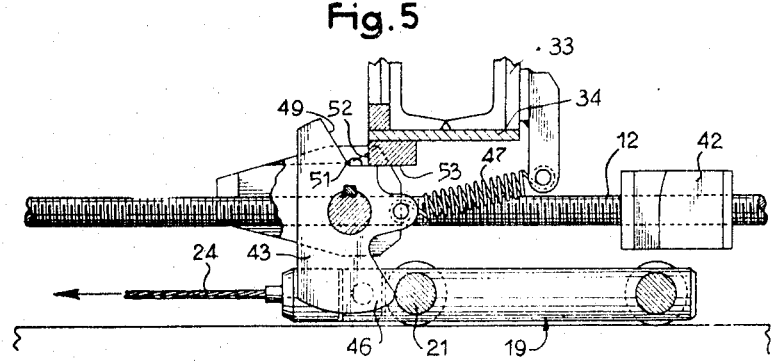
FIG. 5 is a view which is similar to that of FIG. 4 showing the position of the coupling in accordance with a first mode of driving of said trolley by means of the standby mechanism.

Whenever the resistance to rolling of the trolley A is low, the shaft 29, 30, 31 is returned by the spring 47 to its initial position as soon as the claws 39 have passed beyond the nut 42. The trolley thus re-engages with the carriage 18 (as shown in FIG. 5).

Figure 6:
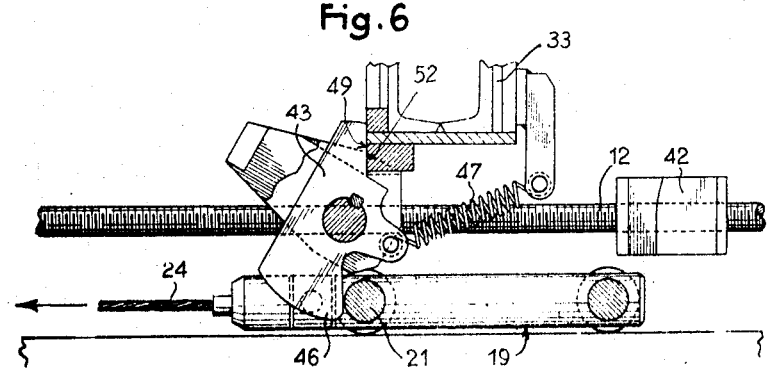
FIG. 6 is a view which is similar to FIG. 5 showing a second mode of driving of said trolley by means of the standby mechanism.

If the said resistance to rolling is high (for example in the event of seizure of one or a number of wheel bearings), the strength of the spring is not sufficient to bring back the shaft and the trolley A is displaced relatively to the carriage 18 by a distance which is equal to the travel which is necessary for the lifting of the claws 39 (as shown in FIG. 6).

The relative positions of the carriage and of the abutment device, as shown in FIGS. 7 and 8 respectively, correspond to the two cases referred-to above for a same end-of-travel position of the trolley A in which this latter can be withdrawn from the water-tank (the shafts 5a being located at 5b).

Figure 9:
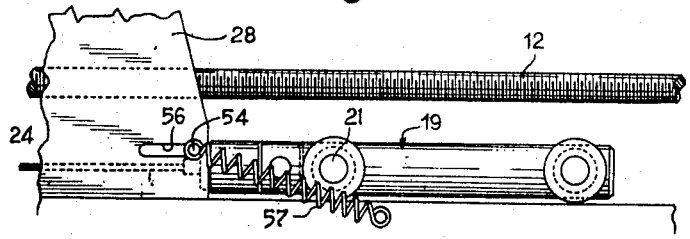
FIG. 9 is a view of the carriage after removal of the trolley.

After the trolley has been removed, the carriage is in all cases, by virtue of the restoring force of the spring 57, located in the position of FIG. 9 wherein the abutment rod 54 is located at the forward end of the elongated slots 56.

What we claim is:

1. An installation for the operation of a trolley which is mounted for movement on a relatively stationary support means, especially for the operation of trolleys which are employed for the purpose of moving an irradiation loop away from the core of a swimming pool reactor or for the purpose of moving said loop nearer to said core, said installation comprising: a main drive mechanism carried by said support means; first coupling means carried by said trolley and normally engaged with said main drive mechanism to couple said trolley thereto, said first coupling means being movable to release from said main drive mechanism, and said main drive mechanism being operable when said first coupling means is engaged therewith to alternately displace said trolley in two opposite directions; an auxiliary drive mechanism carried by said support means, and operable independently of said main drive mechanism to effect relative linear and parallel displacement between said drive mechanisms; and second coupling means carried by said trolley and engaged with said auxiliary drive mechanism, said auxiliary drive mechanism being operable when said first coupling means is released from said main drive mechanism to displace said trolley in at least one direction independently of said main drive mechanism, and said second coupling means being connected with said first coupling means and being operable by displacing said auxiliary drive mechanism relative to said main drive mechanism to move said first coupling means to release the same from said main drive mechanism, so that said auxiliary drive mechanism alone is thereafter effective to displace said trolley.

2. An installation in accordance with claim 1, wherein said first coupling means comprises a shaft rotatably mounted in a frame attached to said trolley, and a coupling element secured to said shaft and which in a first orientation of said shaft is engaged with said main drive mechanism and in a second orientation of said shaft is released from said main drive mechanism, said second coupling means including a lever which is also secured to said shaft and which is engaged with said auxiliary drive mechanism in such a manner that any displacement of said auxiliary drive mechanism relative to the main drive mechanism while said coupling element is engaged with said main drive mechanism produces a rocking motion of the shaft from said first orientation to said second orientation to thereby release said first coupling means from said main drive mechanism.

3. An installation in accordance with claim 2, including additionally a spring arranged to apply force on said lever tending to bring back said shaft from said second orientation to said first orientation.

4. An installation in accordance with claim 2, wherein the main drive mechanism comprises: a threaded rod rotatably mounted on said support to extend in the direction of displacement of said trolley; a nut threaded on said rod; and a drive means for driving said rod in rotation either in one direction or the other, said coupling element being engagable with said nut.

5. An installation in accordance with claim 2, wherein the auxiliary drive mechanism comprises: a carriage movably mounted on said support to move parallel to the direction of displacement of said trolley, said lever being engagable with said carriage; and a cable secured to said carriage and on which a tractive effort can be applied to displace said carriage.

No references cited.

ARTHUR L. LA POINT, *Primary Examiner.*

MILTON BUCHLER, *Examiner.*

F. W. MONAGHAN, *Assistant Examiner.*